(12) United States Patent
Lane et al.

(10) Patent No.: US 12,477,086 B2
(45) Date of Patent: Nov. 18, 2025

(54) VOICE INTERCOM SYSTEM AND METHOD THEREFOR

(71) Applicant: MOTOROLA SOLUTIONS, INC., Chicago, IL (US)

(72) Inventors: Nathan D Lane, Draper, UT (US); Neil Goldman, Brooklyn, NY (US); William Smidlein, Denver, CO (US); Alexander Kazerani, Pacific Palasades, CA (US); Behnam Shahbazi, Marina Del Ray, CA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 83 days.

(21) Appl. No.: 18/334,774

(22) Filed: Jun. 14, 2023

(65) Prior Publication Data
US 2024/0422297 A1 Dec. 19, 2024

(51) Int. Cl.
*H04N 7/18* (2006.01)
*G06K 19/06* (2006.01)
*H04L 61/4594* (2022.01)
*H04M 19/04* (2006.01)

(52) U.S. Cl.
CPC ....... *H04N 7/186* (2013.01); *G06K 19/06037* (2013.01); *H04L 61/4594* (2022.05); *H04M 19/04* (2013.01)

(58) Field of Classification Search
None
See application file for complete search history.

(56) References Cited

U.S. PATENT DOCUMENTS

| 10,685,516 | B1 * | 6/2020 | Raduchel | H04L 67/025 |
| 11,631,291 | B2 | 4/2023 | Schoenfelder et al. | |
| 2015/0035987 | A1 * | 2/2015 | Fernandez | H04N 7/186 |
| | | | | 348/156 |
| 2017/0289359 | A1 | 10/2017 | Keller et al. | |
| 2021/0258721 | A1 * | 8/2021 | Di Saverio | H04W 4/024 |

OTHER PUBLICATIONS

D. Hofman, J.-S. Leu and P. Troller, "Evolution from a Door Bell into an IP Door Phone," 2019 4th International Conference on Intelligent Green Building and Smart Grid (IGBSG), Hubei, China, 2019, pp. 287-290, doi: 10.1109/IGBSG.2019.8886190.
T. Taleb, A. Kunz, S. Schmid and D. Bottazzi, "Call-Handling by an IMS-HNB Based Interactive eDoorbell," 2010 IEEE Wireless Communication and Networking Conference, Sydney, NSW, Australia, 2010, pp. 1-6, doi: 10.1109/WCNC.2010.5506283.
DoorVi—Qr Code Based Video Calling, downloaded from the internet: Jun. 4, 2023, https://www.doorvi.co, all pages.
The International Search Report and the Written Opinion—corresponding Patent Application No. PCT/US2024/029860 filed: May 17, 2024, mailed: Sep. 11, 2024, all pages.

(Continued)

*Primary Examiner* — Amal S Zenati

(57) ABSTRACT

A voice intercom system and method therefor are disclosed. The method includes wirelessly transmitting intercom directory data to a smartphone. The intercom directory data facilitates generation, on the smartphone, of an intercom access directory interface having a plurality of call initiation selection options, each with respect to which a call to a respective call recipient can be attempted.

19 Claims, 4 Drawing Sheets

(56) References Cited

OTHER PUBLICATIONS

Video Intercom Reader Pro, OP-VID-PRO-INT, Data-Sheet, Openpath a Motorola Solutions Company, openpath.com, sales@openpath.com, Mar. 2023, all pages.

"Discover the power of combining the Video Reader Pro & Video Intercom Reader Pro", Avigilon Alta, formerly openpath, May 25, 2023, all pages.

* cited by examiner

VOICE INTERCOM SYSTEM AND METHOD THEREFOR

BACKGROUND

Intercom devices and systems are used by multi-family residential buildings, schools, commercial buildings to interface with visitors, delivery people, company workers, or even tenants that need to reach other tenants. Voice intercoms of the present day and age commonly include more than just audio communication functionality. For example, a voice intercom may include image/video communication capability. Some types of intercoms are simple one button consumer grade solutions (for example, intercoms that form part of a single-family home solution), whereas others types of intercoms may be more complex or expensive (for example, intercoms that form part of a commercial solution, multi-tenant premises solution, etcetera).

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
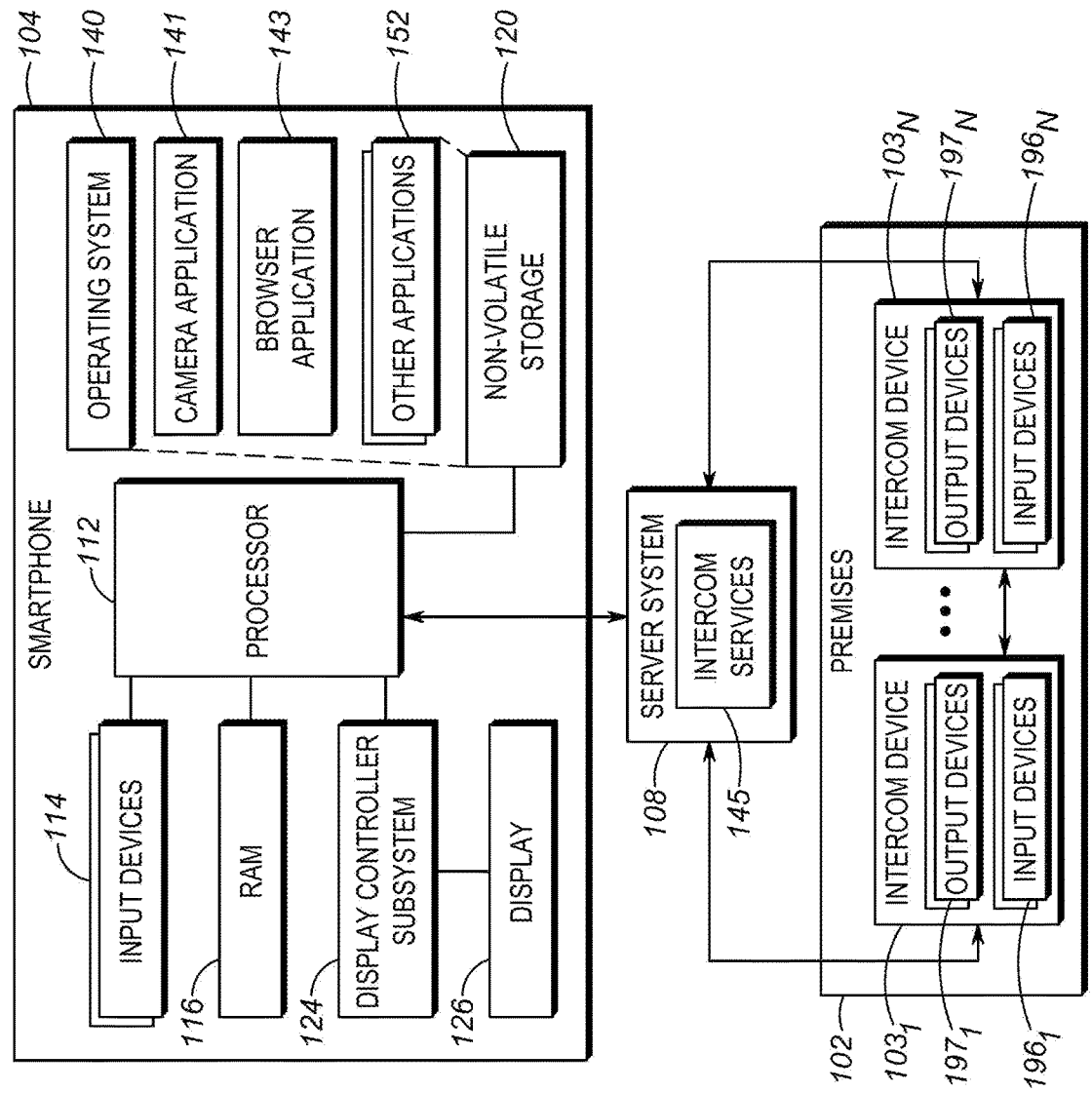
FIG. 1 is a block diagram of an intercom system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a method that includes wirelessly transmitting intercom directory data to a smartphone of a call initiator. The intercom directory data facilitates generation, on the smartphone, of an intercom access directory interface having a plurality of call initiation selection options, each with respect to which a call to a respective call recipient can be attempted. The method also includes receiving call initiation input at a server. The call initiation input is sourced from the smartphone that received the intercom directory data, and specifies a single one of the call initiation selection options for the call over a hard-wired intercom system installed in a premises. The method also includes establishing the call, over the hard-wired intercom system, between the call recipient corresponding to the single one of the call initiation selection options and the call initiator. The method also includes actuating a microphone physically integrated into a premises-attached terminal of the hard-wired intercom system to permit the call initiator to talk to the call recipient.

In accordance with another example embodiment, there is provide a system that includes a server that is configured to wirelessly transmit intercom directory data to a smartphone of a call initiator. The intercom directory data facilitates generation, on the smartphone, of an intercom access directory interface having a plurality of call initiation selection options, each with respect to which a call to a respective call recipient can be attempted. The server is also configured to receive call initiation input. The call initiation input is sourced from the smartphone that receives the intercom directory data, and specifies a single one of the call initiation selection options for the call. The system also includes a premises-attachable intercom terminal that includes a speaker configured to output, once the call is established between the call initiator and the call recipient, live voice audio of the call recipient. The premises-attachable intercom terminal also includes a microphone physically integrated into the intercom terminal. The microphone is configured to be actuated to permit the call initiator to talk to the call recipient.

Each of the above-mentioned embodiments will be discussed in more detail below, starting with example system and device architectures of the system in which the embodiments may be practiced, followed by an illustration of processing blocks for achieving an improved technical method, device, and system for a voice intercom.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented at least in part by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "hard-wired" as used herein in relation to describing an electronic device or system is understood to mean that the device or system is fixedly installed in some manner (for example, by power wiring) in particular fixed location(s) and/or area(s) in a premises. It will be understood that a hard-wired device or system need not necessarily be entirely "hard-wired", nor does a hard-wired device or system necessarily have to be lacking the capability for connection to a premises outlet.

Further advantages and features consistent with this disclosure will be set forth in the following detailed description, with reference to the figures.

Referring now to the drawings, and in particular FIG. 1 which is a block diagram of an example intercom system 100 within which methods in accordance with example embodiments can be carried out. Included within the illustrated intercom system 100 are intercom devices $103_1$ to $103_N$, one or more smartphones 104 and a server system 108. In some example embodiments, the smartphone 104 is any suitable wirelessly-enabled handheld device such as, for example, a standard-sized smartphone, a phablet, a personal digital assistant (PDA), etcetera. With respect to the server system 108, this could comprise a single physical machine that includes processor(s) or multiple physical machines that include processors. It will be understood that the server system 108 need not be contained within a single chassis, nor necessarily will there be a single location for the server system 108. In at least one example embodiment, part or all of the server system 108 is provided within the intercom system 100 by way of a cloud computing implementation. The illustrated server system 108 includes intercom services 145 (a more detailed explanation of the intercom services 145 is provided later herein).

As will be appreciated by those skilled in the art, at least some of the functionality of the server system 108 can be implemented within the smartphone 104 rather than within the server system 108 (for instance, in some alternative examples, an intercom application may be downloaded onto the smartphone 104, resulting in persistent storage of certain software code related and complementary to code included within the server system 108).

The smartphone 104 communicates with the server system 108 through one or more networks. These networks can include the Internet, or one or more other public/private networks coupled together by network switches or other communication elements. As an example and not by way of limitation, the smartphone 104 can communicate with an ad-hoc network, a Personal Area Network (PAN), a Local Area Network (LAN), a Wide Area Network (WAN), a Metropolitan Area Network (MAN), or one or more portions of the Internet or a combination of two or more of these. One or more portions of one or more of these networks may be wireless. As an example, the smartphone 104 may be capable of communicating with a Wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these.

The smartphone 104 includes at least one processor 112 that controls the overall operation of the smartphone. The processor 112 interacts with various subsystems such as, for example, input devices 114 (such as, for example, a selected one or more of a virtual keyboard, touch pad, roller ball, integrated camera, integrated microphone, etcetera), random access memory (RAM) 116, non-volatile storage 120, display controller subsystem 124 and other subsystems. The display controller subsystem 124 interacts with display 126 and it renders graphics and/or text upon the display 126. For example, a Graphical User Interface (GUI) may be rendered upon the display 126.

Still with reference to the smartphone 104 of the intercom system 100, operating system 140 and various software applications used by the processor 112 are stored in the non-volatile storage 120. The non-volatile storage 120 is, for example, one or more non-volatile cards, solid state drives, or some other suitable form of computer readable medium that retains recorded information after the smartphone 104 is turned off. Regarding the operating system 140, this includes software that manages computer hardware and software resources of the smartphone 104 and provides common services for computer programs. Also, those skilled in the art will appreciate that the operating system 140, browser application 143, and other applications 152, or parts thereof, may be temporarily loaded into a volatile store such as the RAM 116. The processor 112, in addition to its operating system functions, can enable execution of the various software applications on the smartphone 104.

Regarding the above-mentioned browser application 143 stored within the smartphone 104, in some examples this may be any conventional software application that allows web pages to be viewed on the display 126.

Still with reference to FIG. 1, the server system 108 includes various software components for carrying out functions of the server system 108. These software components will vary depending on the particular implementation requirements defined for the server system 108. In some examples, the server system 108 includes one or more media server modules for managing and processing of video, audio and other media within the intercom system 100. Other software components of the server system 108 might include, for example, special test and debugging software, software to facilitate version updating of modules within the server system 108, software to facilitate the implementing of access control functionality, etc.

Continuing with FIG. 1, the illustrated intercom devices $103_1$ to $103_N$ are understood to be attached by wiring to outlets (or other suitable attachment points) within premises 102, and they are also coupled to the server system 108 as network-addressable devices. Regarding the premises 102, examples of types of premises include multi-dwellings residential buildings, office buildings, school buildings, industrial properties, hospitals, etc.

In some examples, one or more of the intercom devices $103_1$ to $103_N$ are coupled to the server system 108 via one or more suitable networks. These networks can include the Internet, or one or more other public/private networks coupled together by network switches or other communication elements. The network(s) could be of the form of, for example, client-server networks, peer-to-peer networks, etc.

Data connections between any one or more the intercom devices $103_1$ to $103_N$ and the server system 108 can be any number of known arrangements, examples of which were previously herein detailed. In some examples, bidirectional communication between each of the intercom devices $103_1$ to $103_N$ and the smartphone 104 is established and maintained via the server system 108 that is coupled therebetween. In some examples, the intercom devices $103_1$ to $103_N$ can communicate directly with each other via a suitable peer-to-peer communications protocol. The illustrated intercom devices $103_1$ to $103_N$ include respective input devices $196_1$ to $196_N$ (for example, each of the intercom devices $103_1$ to $103_N$ may include an integrated camera, an integrated microphone, etcetera). The illustrated intercom devices $103_1$ to $103_N$ also include respective output devices 1971 to 197N (for example, each of the intercom devices $103_1$ to $103_N$ may include an integrated speaker, an integrated display screen, etcetera).

Figure 2:
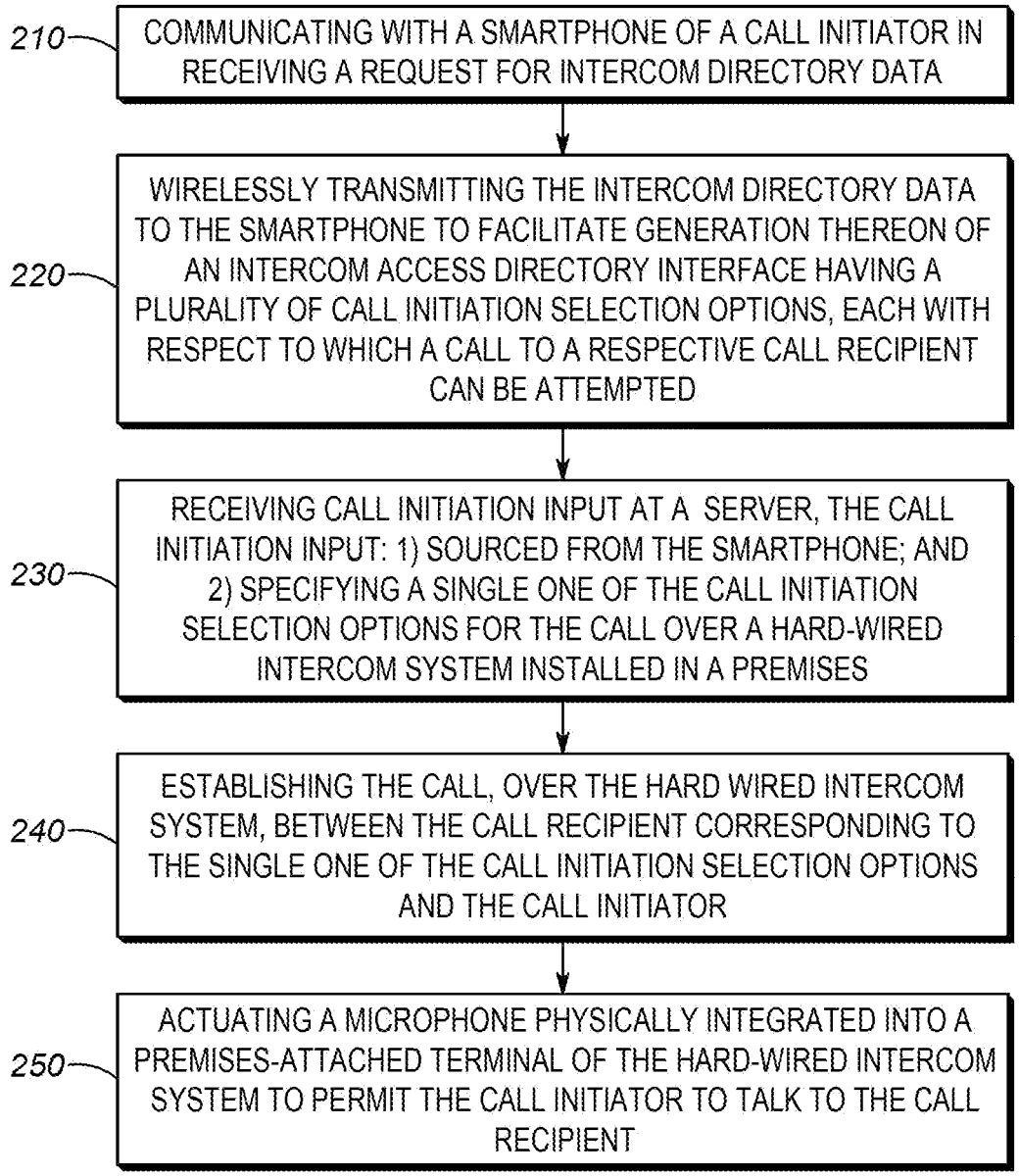
FIG. 2 is a flow chart illustrating a method in accordance with an example embodiment.

Reference is now made to FIG. 2. FIG. 2 is a flow chart illustrating a method 200 in accordance with an example embodiment.

Referring to FIG. 2, the illustrated method 200, which in some examples is carried out within the intercom system 100, includes communicating (210) with a smartphone to receive a request for intercom directory data. For example, the smartphone 104 (FIG. 1) may initiate communication with the server system 108 (which may be remote or local) via a resource locator in connection with requesting intercom directory data, stored within storage of the server system 108), and managed by the intercom services 145.

In some examples, the intercom directory data is derived from data stored in a physical access control database. As will be understood by those skilled in the art, a physical access control database may be dynamically updateable to permit, for instance, changes, additions and deletions in relation tenants, employees, etcetera that acquire or lose access control credentials (as the case may be).

Figure 3:
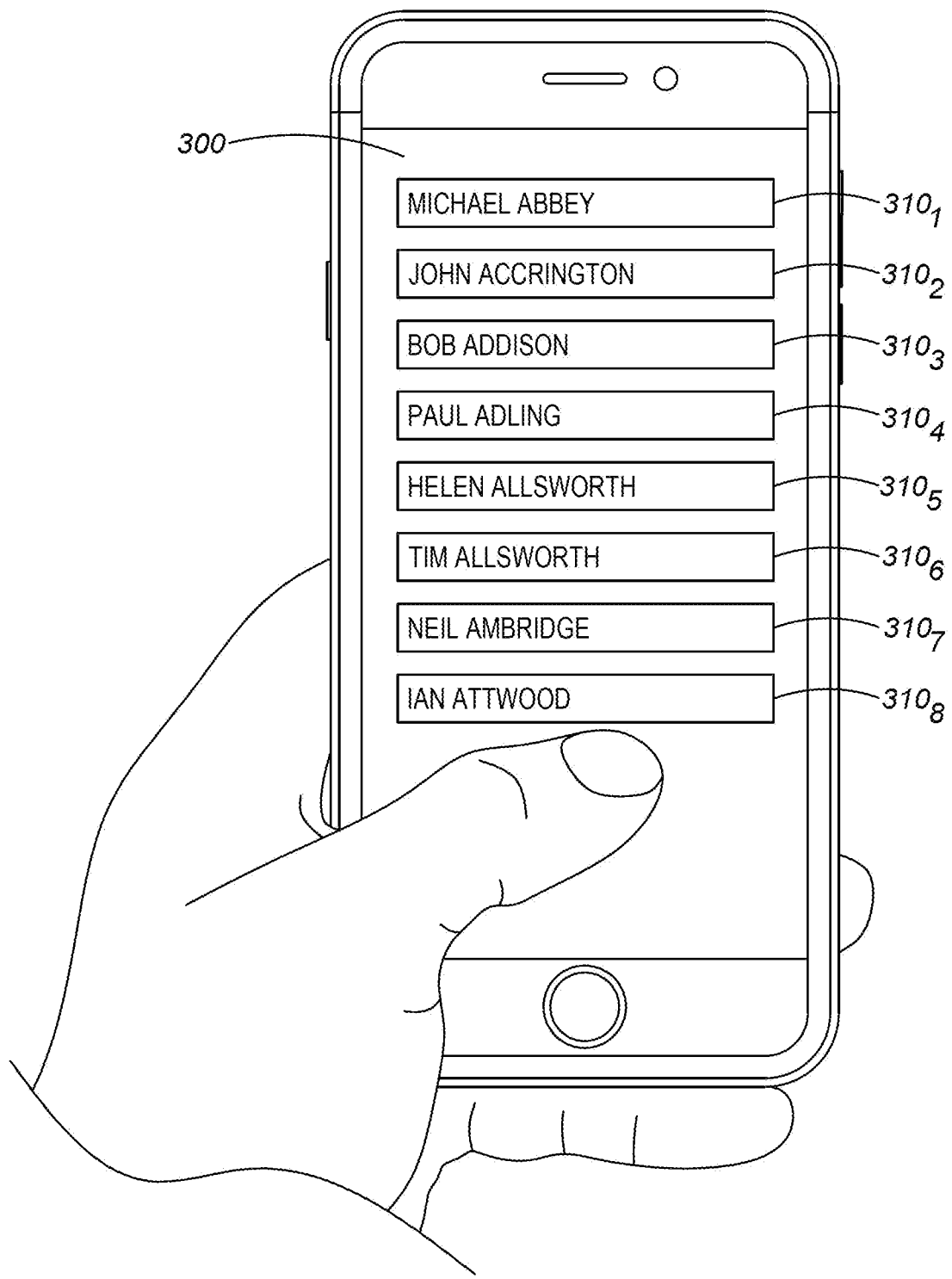
FIG. 3 is a diagram of an intercom access directory interface in accordance with an example embodiment.

Next, the method 200 includes wirelessly transmitting intercom directory data (220) to a smartphone (for example, to the smartphone 104 of FIG. 1 in response to the received request therefrom). Also, it will be understood that this intercom directory data facilitates generation, on the smartphone, of a dynamically updateable intercom access directory interface having a plurality of call initiation selection options, each with respect to which a voice intercom call can be attempted to a respective call recipient (which will usually be a tenant/occupant of a premises, but in some examples may also be someone remote from the premises). Further in this regard, FIG. 3 is a diagram of an intercom access directory interface 300 consistent with carrying out some examples of the method 200. The intercom access directory interface 300 includes a plurality of call initiation selection options $310_1$-$310_8$ (and the call initiator can select any desired one of the options $310_1$-$310_8$ by tapping on the corresponding area of the smartphone screen).

Regarding the call initiation selection options $310_1$-$310_8$, while these are illustrated in FIG. 3 as people's names; however, alternatives such as, for example, apartment/condo unit numbers are contemplated as well. Also, by providing a virtual directory (as herein described and illustrated) instead of a paper one, this is potentially alleviating some of the disadvantages of the paper directory such as, for instance, difficulties with frequently changing the paper every time a tenant leaves/moves in, and also not having to install an expensive screen at an outside location where it could potentially be graffitied or subject to some other form of vandalism.

Next, the method 200 includes receiving call initiation input (230) at a cloud-based server (for example, the server system 108 of FIG. 1). The call initiation input is sourced from the smartphone that received the intercom directory data, and specifies a single one of the call initiation selection options for the voice intercom call over a hard-wired intercom system installed in the premises. (As mentioned previously, in some examples the call intiator/user of the smartphone can select one of the options $310_1$-$310_8$ by tapping on the corresponding area of the smartphone screen).

Next, the method 200 includes establishing the voice intercom call (240), over the hard-wired intercom system, between the call recipient corresponding to the single one of the call initiation selection options and a call initiator. In some examples, the voice intercom call may include only live audio; however, in other examples, the call may include both live video and audio parts. In some examples, the voice intercom call may be carried out entirely over wiring installed in the premises; however, in other examples, the path of the call may be partly wired and partly wireless.

Next, the method 200 includes actuating a microphone (250) physically integrated into a premises-attached terminal of the hard-wired intercom system to permit the call initiator to talk to the call recipient. For example, say the intercom device $103_1$ (FIG. 1) is at an entrance of the premises 102 attached thereto. Consistent with some examples of the action 250, a microphone (one of input devices $196_1$) may be actuated to permit the call initiator/user of the smartphone 104 to talk to the call recipient (who: i) may be located at a different one of the intercom devices $103_1$ to $103_N$, thereby receiving the call at an integrated microphone of a premises-attached intercom terminal of the hard-wired intercom system, or ii) may simply receive the call through some other suitable device, such as a smartphone or a touchscreen computing device installed within a premises unit of the call recipient within the premises). Importantly, the call initiator/visitor in the above-described example does not use the microphone of the smartphone 104 for the call with the call recipient, but rather uses the microphone of the intercom device $103_1$.

Figure 4:
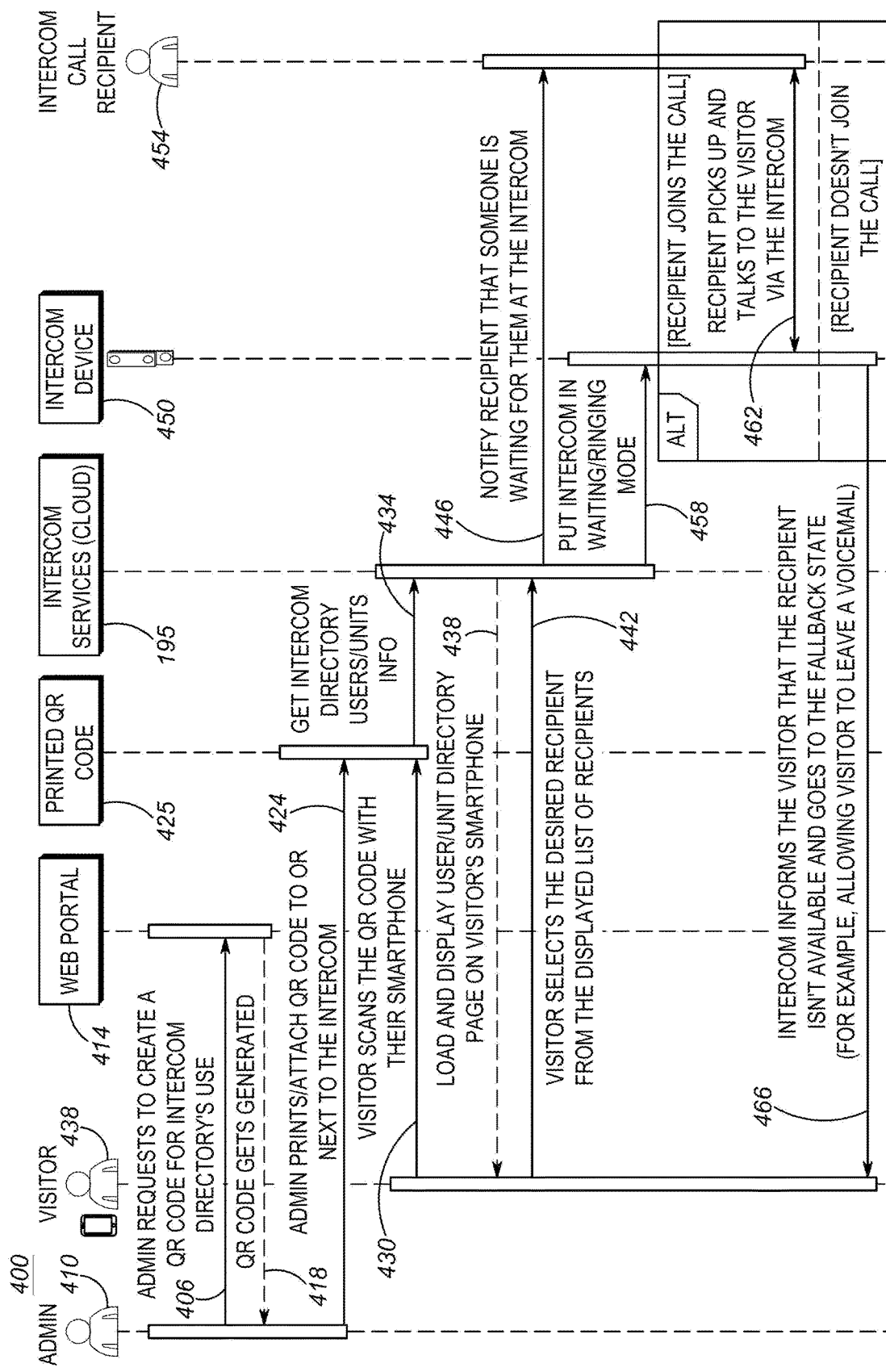
FIG. 4 is a sequence diagram providing additional example technical details that relate to the method of FIG. 2.

Reference is now made to FIG. 4. FIG. 4 is a sequence diagram 400 providing additional example technical details that relate to the method 200 of FIG. 2.

In the sequence diagram 400, solid arrow 406 represents a person 410 (for example, someone assigned administrative (ADMIN) privileges in respect of intercom services 195) sending a request to web portal 414 to create a Quick Response (QR) code for directory use in connection with an intercom system (for example, the intercom system 100 of FIG. 1).

Next in the sequence diagram 400, dashed arrow 418 represents the QR being generated by the web portal 414 and transmitted to a computing terminal of the person 410.

Next in the sequence diagram 400, solid arrow 424 represents the person 410 attaching a printed sticker 425 of the QR code that was generated to a suitable physical location (such as, for example, adjacent the location of the intercom device $103_1$ on a suitable surface where it will be easily visible).

Next in the sequence diagram 400, solid arrows 430 and 434 represent, respectively: i) premises visitor 438 scanning (for example, capturing an image using the integrated camera on the smartphone 104) the printed QR code 425; and ii) using a resource locator derived from the QR code to permit a request for intercom directory data to be transmitted to and processed by the intercom services 195.

Next in the sequence diagram 400, dashed arrow 438 represents loading and displaying a user/unit directory page on the smartphone of the visitor 438 (for example, what was shown and described previously in relation to FIG. 3).

Next in the sequence diagram 400, solid arrow 442 represents the visitor 438 selecting the desired recipient from the displayed list of recipients (for instance, in the example embodiment of FIG. 3, the smartphone user taps his or her finger on one of the call initiation selection options $310_1$-$310_8$, and this selection is transmitted as selection data to the intercom services 195 in the cloud).

Next in the sequence diagram 400, solid arrow 446 represents a notification being sent from the intercom services 195 to intercom call recipient 454 that someone is waiting for them at the location of intercom device 450 (for example, a main or other entrance door to the premises 102). Also, it will be understood that another one of the intercom devices (for example, located within the premises unit of the call recipient) may be receiving the notification, or alternatively the notification may be received through some other suitable communications device, such as a smartphone.

Next in the sequence diagram 400, solid arrow 458 represents the intercom services 195 communicating with the intercom device 450 to put the intercom device 450 into a waiting/ringing mode.

Next, one of two possibilities follows in the sequence diagram 400 depending on whether or not the intercom call recipient 454 answers (joins) the call. If the intercom call recipient 454 answers the call, then solid bidirectional arrow 462 follows, live voice audio is outputted from the premises-attached intercom terminal at the location of the visitor 438, and a conversation between the visitor 438 and the intercom call recipient 454 proceeds. If the intercom call recipient 454 does not answer the call, then solid arrow 466 follows, and the intercom device 450 communicates a message to the visitor 438 that the intercom call recipient 454 is not available (the intercom device 450 goes into a fallback state which may, for example, prompt and provide for the visitor 438 to leave a voicemail message for the intercom call recipient 454).

Alternatives regarding this last part shown in FIG. 4 (i.e. call recipient not joining the call) are contemplated. Firstly, there will not necessarily be a same reason every time a call recipient does not join a call. For instance, one reason may be that the call is not answered, but another reason may be that the call is declined. If it's the call is not answered reason, it is contemplated that a pre-recorded audio clip may be played, or an audio clip that was generated based on a specific pre-established text may be played, or an audio clip that was generated with a text that was customized by a person may be played, etcetera. If it's the call is declined reason, it is contemplated that a pre-recorded audio clip may be played, or an audio clip that was generated based on a specific pre-established text may be played, or an audio clip that was generated with a text that was customized by a person may be played, etcetera.

Any of the above listed alternative call-not-joined handlings can occur in combination with the call initiator being permitted to leave a voicemail, or without any ability for the call initiator to leave a voicemail.

Also, particularly for the case where the call initiator has selected a premises unit (identifiable by a specific number) that may be associated with multiple prospective call recipients, it is contemplated that call attempts may be made automatically in sequence to more than one of these prospective call recipients, such that the solid arrow 462 will in FIG. 4 will apply to whichever of these prospective call recipients accepts the call when it's their turn in the order of the sequence.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot establish a voice intercom call, among other features and functions set forth herein).

In the foregoing specification, specific embodiments have been described. However, one of ordinary skill in the art appreciates that various modifications and changes can be made without departing from the scope of the invention as set forth in the claims below. For example, instead of using a QR code mechanism to enable the generation of a request for intercom directory data, this may instead be implemented without a QR code by an alternative mechanism such as, for instance, by way of Near Field Communication (NFC). Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising." "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/ or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    wirelessly transmitting intercom directory data to a smartphone of a call initiator, the intercom directory data facilitating generation, on the smartphone, of an intercom access directory interface having a plurality of call initiation selection options, each with respect to which a call to a respective call recipient can be attempted;
    receiving call initiation input at a server, the call initiation input sourced from the smartphone that received the intercom directory data, and specifying a single one of the call initiation selection options for the call over a hard-wired intercom system installed in a premises;

establishing the call, over the hard-wired intercom system, between the call recipient corresponding to the single one of the call initiation selection options and the call initiator; and actuating a microphone physically integrated into a premises-attached terminal of the hard-wired intercom system to permit the call initiator to talk to the call recipient.

2. The method of claim 1, wherein:

the premises-attached terminal is located adjacent a displayed QR code, and the displayed QR code is scannable by the smartphone to facilitate obtaining the intercom directory data.

3. The method of claim 1 wherein the intercom directory data transmitted to the smartphone is stored in cloud storage remote from the premises.

4. The method of claim 1 wherein the call includes both live video and audio parts.

5. The method of claim 1 wherein the call is carried out entirely over wiring installed in the premises.

6. The method of claim 1 further comprising actuating another microphone physically integrated into another premises-attached terminal of the hard-wired intercom system to permit the call recipient to talk to the call initiator.

7. The method of claim 6 further comprising transmitting a notification, to the another premises-attached terminal of the hard-wired intercom system and prior to the call becoming established, that the call is incoming.

8. The method of claim 1 wherein the intercom directory data is derived from data stored in a dynamically updateable, physical access control database.

9. The method of claim 8 wherein the physical access control database forms part of a physical access control system of the premises, and the premises is one of a multi-dwellings residential building, an office building, a school building, an industrial property, and a hospital.

10. The method of claim 1 further comprising transmitting, prior to the call becoming established, an incoming call notification, to:

another smartphone carried by the call recipient, or a touchscreen computing device installed within a premises unit of the call recipient, within the premises.

11. The method of claim 1 wherein the each of the call initiation selection options is either corresponding to a name of a person or a specific unit number that identifies a respective premises unit within the premises.

12. The method of claim 7 wherein the another premises-attached terminal is a touchscreen computing device.

13. A system comprising:

a server configured to:

wirelessly transmit intercom directory data to a smartphone of a call initiator, the intercom directory data facilitating generation, on the smartphone, of an intercom access directory interface having a plurality of call initiation selection options, each with respect to which a call to a respective call recipient can be attempted; and receive call initiation input, the call initiation input sourced from the smartphone that receives the intercom directory data, and specifying a single one of the call initiation selection options for the call; and a premises-attachable intercom terminal that includes:

a speaker configured to output, once the call is established between the call initiator and the call recipient, live voice audio of the call recipient; and a microphone physically integrated into the intercom terminal, the microphone configured to be actuated to permit the call initiator to talk to the call recipient.

14. The system of claim 13 wherein the call includes both live video and audio parts.

15. The system of claim 14 wherein the premises-attachable intercom terminal includes an integrated camera configured to capture at least part of the live video for the call.

16. The system of claim 13 wherein the each of the call initiation selection options is either corresponding to a name of a person or a specific unit number that identifies a respective premises unit within a premises.

17. The system of claim 13 further comprising further comprising a physical access control system that includes a dynamically updateable, physical access control database, wherein the intercom directory data is derived from data stored in the physical access control database.

18. The system of claim 13 further comprising another premises-attachable terminal that includes another microphone configure to be actuated to permit the call recipient to talk to the call initiator.

19. The system of claim 18 wherein the another premises-attachable terminal is a touchscreen computing device.

* * * * *